United States Patent
Williamson

(10) Patent No.: US 9,020,882 B2
(45) Date of Patent: Apr. 28, 2015

(54) DATABASE HOSTING MIDDLEWARE DIMENSIONAL TRANSFORMS

(75) Inventor: Eric Williamson, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 962 days.

(21) Appl. No.: 12/324,206

(22) Filed: Nov. 26, 2008

(65) Prior Publication Data

US 2010/0131456 A1 May 27, 2010

(51) Int. Cl.
*G06F 17/30* (2006.01)

(52) U.S. Cl.
CPC .................. *G06F 17/30592* (2013.01)

(58) Field of Classification Search
None
See application file for complete search history.

(56) References Cited

U.S. PATENT DOCUMENTS

| | | | |
|---|---|---|---|
| 5,890,167 A * | 3/1999 | Bridge et al. ................ | 1/1 |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,152,062 B1 * | 12/2006 | Draper et al. ................ | 1/1 |
| 7,299,241 B2 | 11/2007 | Reed et al. | |
| 7,660,822 B1 | 2/2010 | Pfleger | |
| 2001/0049678 A1 | 12/2001 | Yaginuma | |
| 2002/0029207 A1 | 3/2002 | Bakalash et al. | |
| 2002/0035562 A1 * | 3/2002 | Roller et al. ................ | 707/6 |
| 2002/0083034 A1 | 6/2002 | Orbanes et al. | |
| 2002/0087516 A1 | 7/2002 | Cras et al. | |
| 2002/0152210 A1 * | 10/2002 | Johnson et al. ................ | 707/9 |
| 2002/0169658 A1 | 11/2002 | Adler | |
| 2003/0114950 A1 | 6/2003 | Ruth et al. | |
| 2003/0115194 A1 | 6/2003 | Pitts et al. | |
| 2003/0115207 A1 | 6/2003 | Bowman et al. | |
| 2003/0120372 A1 | 6/2003 | Ruth et al. | |

(Continued)

OTHER PUBLICATIONS

ASPFAQ.com, "What are the valid styles for converting datetime to string?" (2006) http://databases.aspfaq.com/database/what-are-the-valid-styles-for-converting-datetime-to-string.html.*

(Continued)

*Primary Examiner* — Syed Hasan
(74) *Attorney, Agent, or Firm* — Lowenstein Sandler LLP

(57) ABSTRACT

Embodiments relate to systems and methods for a middleware database hosting dimensional transforms. A set of applications can access a combined data of a set of data sources via a database system. The set of data sources can be configured with diverse dimensions and associated data. The requesting application(s) can generate a request to the database system to extract data in compatible formats for the application(s). In embodiments, the database system can transform selected dimensional data (e.g., company, year, sales dimensions) from the data sources into transformed dimensional data. The requesting application(s) can therefore perform searches, sorts, and/or other operations on the transformed dimensional results.

20 Claims, 4 Drawing Sheets

(56) References Cited

U.S. PATENT DOCUMENTS

| | | |
|---|---|---|
| 2003/0126114 A1* | 7/2003 | Tedesco .......................... 707/3 |
| 2003/0184585 A1 | 10/2003 | Lin et al. |
| 2003/0225736 A1 | 12/2003 | Bakalash et al. |
| 2004/0039736 A1* | 2/2004 | Kilmer et al. .................... 707/3 |
| 2004/0128296 A1* | 7/2004 | Krishnamurthy et al. .... 707/100 |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060382 A1* | 3/2005 | Spector et al. ................ 709/213 |
| 2006/0004833 A1 | 1/2006 | Trivedi et al. |
| 2006/0036707 A1 | 2/2006 | Singh et al. |
| 2006/0136462 A1* | 6/2006 | Campos et al. ............... 707/102 |
| 2006/0262145 A1 | 11/2006 | Zhang et al. |
| 2006/0271583 A1* | 11/2006 | Hulen et al. .................. 707/102 |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2010/0057700 A1 | 3/2010 | Williamson |
| 2010/0057777 A1 | 3/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

Using OLAP and Multi-Dimensional data for decision making, Hasan et al. IEEE 2001.

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

Williamson, "Systems and Methods for Validating Interpolation Results Using Monte Carlo Simulations on Interpolated Data Inputs", U.S. Appl. No. 13/037,344, filed Feb. 28, 2011.

Answering Joint Queries from Multiple Aggregate OLAP Databases, Pourabbas et al, LNCS 2737, pp. 24-34, 2003.

* cited by examiner

DATABASE HOSTING MIDDLEWARE DIMENSIONAL TRANSFORMS

FIELD

The present teachings relate to systems and methods for a middleware database hosting dimensional transforms, and more particularly to platforms and techniques for aggregating multiple data sources having different dimensions via a middleware database storing dimensional transforms to permit consumption of the dimensional data by diverse applications.

BACKGROUND OF RELATED ART

In networked data technologies, the introduction and expanded use of middleware platforms has enabled a wider range of applications access to a wider range of data sources. Middleware platforms in general are known which allow a single application to access diverse or incompatible data sources, by commonizing the data schema used by those separate sources for use by the application.

It may be desirable to provide methods and systems of a middleware database which intermediates between a set of data sources containing data of different dimensions and/or formats, and a set of applications requesting data of different dimensions or data types from those various original data sources.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for a middleware database hosting dimensional transforms. More particularly, embodiments relate to platforms and techniques for receiving a set of data requests from a set of applications in a middleware database system. The middleware database system, which can be hosted on a server, can receive the data request and make a determination of the types or dimensions of data that are being requested by the requesting application(s). Rather than storing data entries directly, the middleware database system can store links to a set of remote data sources which host data available to search based on the data request, as well as dimensional data transforms hosted in the database system itself. The set of dimensional data transforms can extract the data dimensions returned from the set of data sources, and transform, extend, or otherwise modify the received data to generate transformed dimensional output or data. It may be noted that in embodiments, the dimensional data transforms can operate on single dimensions (e.g., rows or columns) of source databases to transform those dimensions individually or in isolation, rather than transform the entire source database. In embodiments, besides or in addition to source data stored in database storage, dimensional transforms can be run on other sources of data, such as streamed data. In embodiments, the transformed dimensional data can be combined into further data formats, such as online analytical processing (OLAP) data format, object oriented data format, relational data format, and/or other data formats, structures, or configurations.

Reference will now be made in detail to exemplary embodiments of the present teachings, which are illustrated in the accompanying drawings. Where possible the same reference numbers will be used throughout the drawings to refer to the same or like parts.

Figure 1:
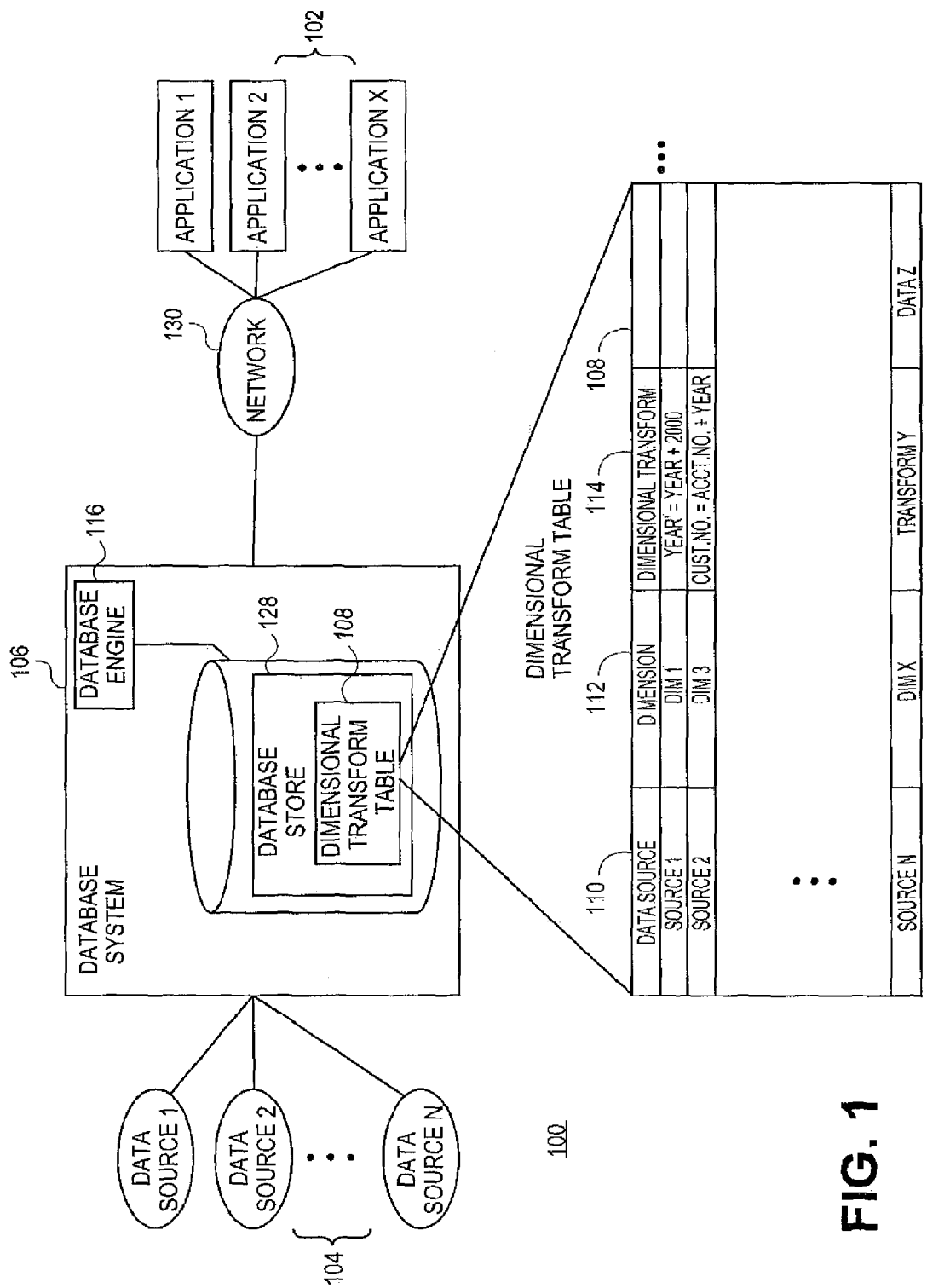
FIG. 1 illustrates an overall system for a middleware database hosting dimensional transforms, according to various embodiments.

FIG. 1 illustrates an overall system 100 in which systems and methods for a middleware database hosting dimensional transforms can operate, according to various embodiments. A set of applications 102 can communicate with a database system 106 via one or more networks 130. Set of applications 102 can be or include, for example, a set of database applications, statistical applications, spreadsheet applications, browsing applications, messaging applications, media playback applications, and/or other applications. In embodiments, set of applications 102 can include online analytical processing (OLAP) applications, or other database or data analysis applications. One or more networks 130 can be or include, for example, the Internet or other public or private networks. Database system 106 can be or include a server with associated memory, storage, and other resources configured to receive one or more set of data requests 118 from one or more application in set of applications 102, and interpret that set of data requests 118 to initiate data extraction from set of data sources 104 to build a transformed set of dimensional data to return to the set of applications 102, to respond to that set of requests 118.

More particularly, and as shown in FIG. 1, database system 106 can communicate with a set of data sources 104 which host data that one or more applications in set of applications 102 wishes to access. The set of data sources 104 can be on include databases or data stores, such as relational databases, online analytic processing (OLAP) data sources, object-oriented data stores, and/or other databases or other data stores. According to embodiments, the set of data sources 104 can be multi-dimensional data sources.

Database system 106 can receive a set of data requests 118 from one or more application in set of applications 102, and identify which data source or sources in set of data sources 104 contain dimensions of data (e.g., rows labeled "annual sales") corresponding to the data request. Database system 106 can then, via an internal database engine 114 and/or other logic, communicate with data sources having corresponding data, and extract that data from the data sources. For example, one or more dimension of each data source can be read out or retrieved by database system 106. When all dimensional data corresponding to the set of data requests 118 is extracted from set of data sources 104, database system 106 can analyze that data to generate an output via a dimensional transform table 108 to conform the structyral dimension(s) of the data to those compatible with the requesting application(s).

More particularly, in embodiments database system 106 can generate and access a dimensional transform table 108, which can be stored in database store 128. Dimensional transform table 108 can contain entries mapping the dimensions and/or fields extracted from the data sources in set of data sources 104 to a transformed dimension encapsulating the subject data in a new dimensional format. In embodiments, dimensional transform table 108 can contain fields including a data source field 110 identifying the data source which contributes a dimension, field, or other data. Dimensional transform table 108 can also include a dimension field 112 representing the original dimension of the extracted data in its host data source. Transform table 108 can further include a dimensional transform 114, representing a transformation of the original source dimension to a transformed dimension for output to the requesting application(s). In embodiments, for example, a data field representing "year" in one of set of data sources 104 can be transformed from a two-digit representation, such as "02", to a four-digit representation ("2002") by adding 2000 to that value of that dimension or field. Other types of dimensional transform 114 are possible.

Figure 2:
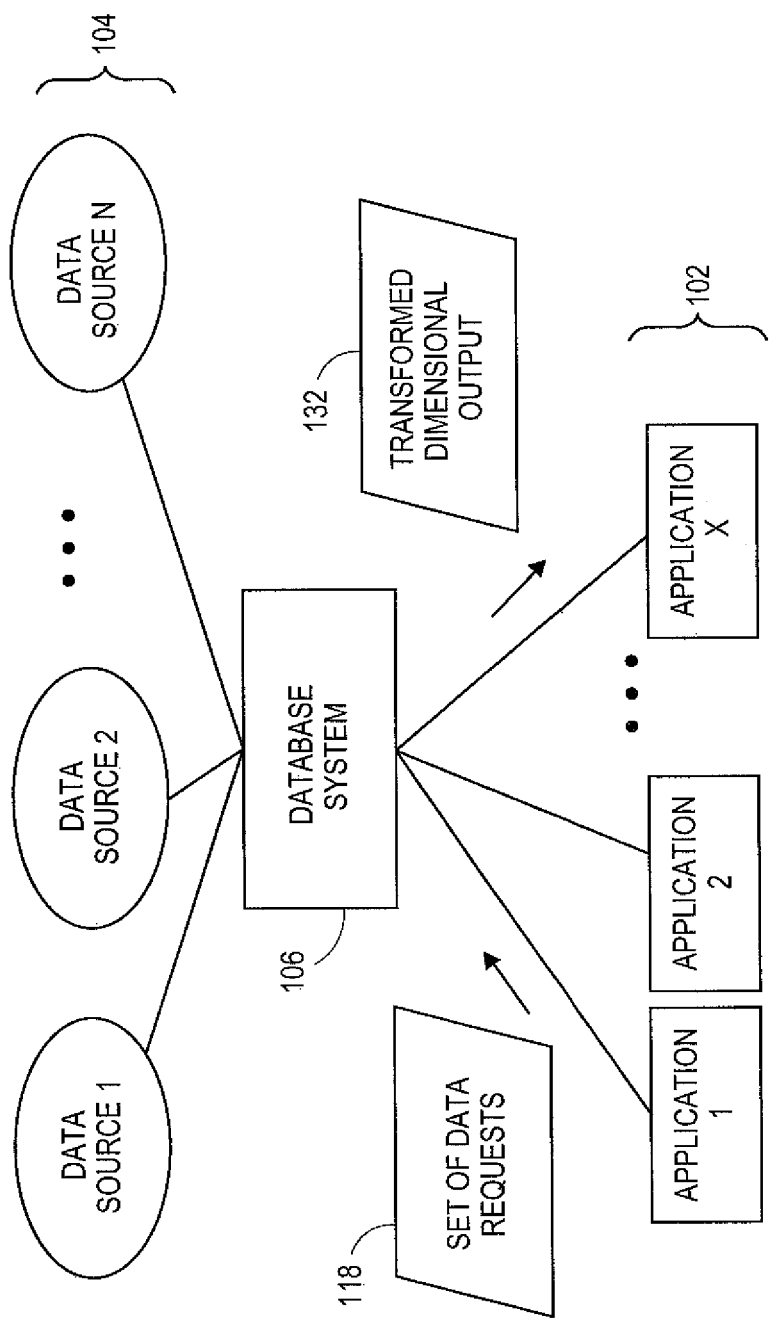
FIG. 2 illustrates an example of the extraction of transformed dimensional output, according to various embodiments.

As shown, for example, in FIG. 2, once a dimensional transform 114 has been applied to one or more dimensions of the set of data sources 104, the database system 106 can transmit the transformed dimensional output 132 to the requesting application(s) in set of applications 102. The transformed dimensional output 132 can arrive at the requesting application in a format, dimensions, or other configuration required by that application. For instance, if the requesting application is an OLAP application, the transformed dimensional output 132 can comprise a three-dimensional data block or matrix, generated for instance by combining selected dimensions hosted in one or more of set of data sources 104. Other types, configurations, and levels of transformed dimensional output 132 are possible.

Figure 3:
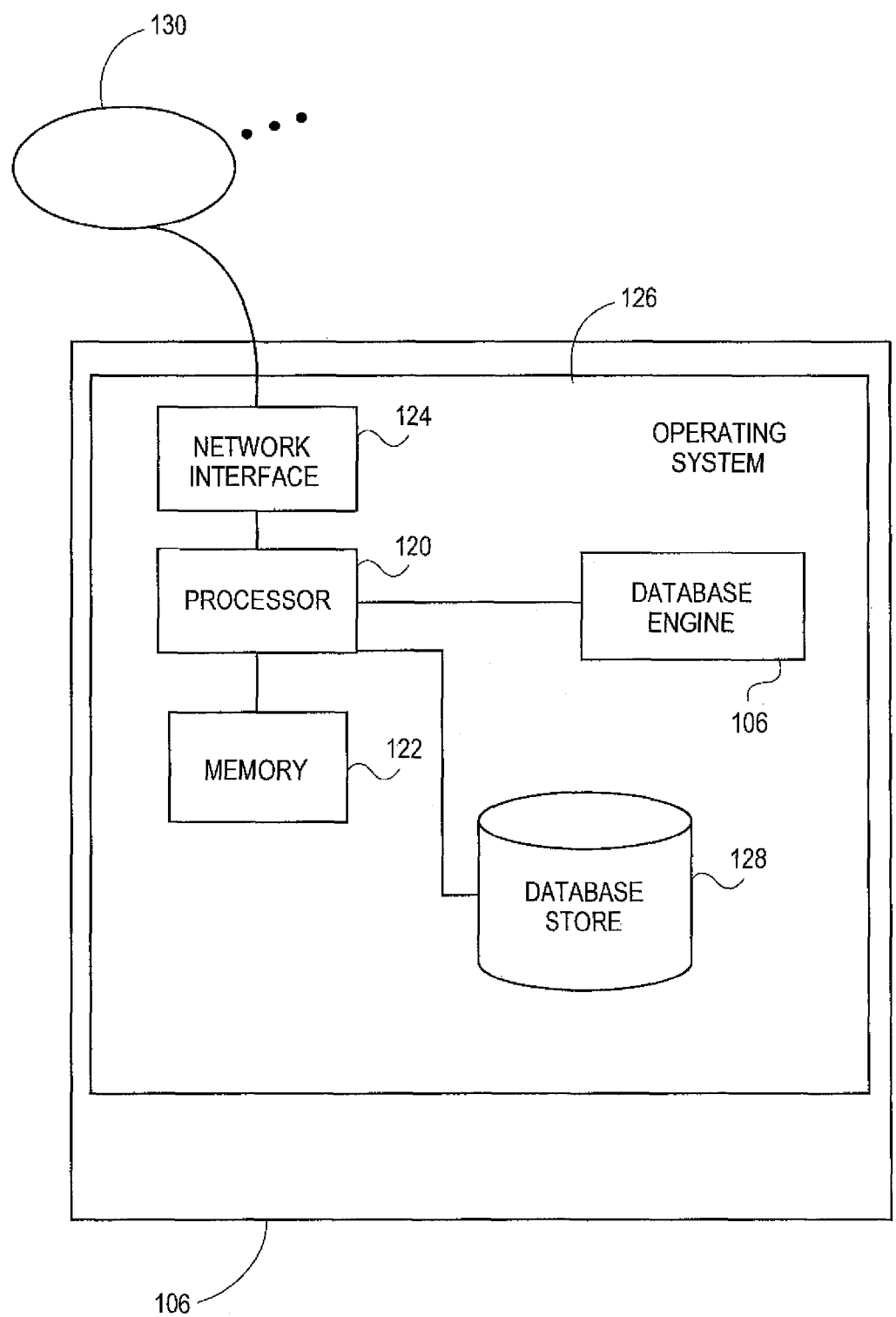
FIG. 3 illustrates an illustrative hardware configuration of hardware that can implement a database system, according to various embodiments.

FIG. 3 illustrates an exemplary configuration of database system 106 which can be used in systems and methods for hierarchical aggregation of multi-dimensional data sources, according to embodiments. Database system 106 can, for instance, support or host database store 128, database engine 106, and other hardware, software, and other resources to generate dimensional transforms of source data, according to the present teachings. In embodiments as shown, database system 106 can comprise a processor 120 communicating with memory 122, such as electronic random access memory, operating under control of or in conjunction with operating system 126. Operating system 126 can be, for example, a distribution of the Linux™ operating system, the Unix™ operating system, or other open-source or proprietary operating system or platform. Processor 120 also communicates with database store 128, such as a database stored on a local hard drive or other storage. Processor 120 further communicates with network interface 124, such as an Ethernet or wireless data connection, which in turn communicates with one or more networks 130, such as the Internet or other public or private networks. Processor 120 can, for example, communicate with set of applications 102 and set of data sources 104 via one or more networks 130. Processor 120 also communicates with database system 106 and other resources to control the processing of set of data sources 104, including to extract selected dimensional data from those sources, locate common dimensions and/or fields, and build or update transform table 108 reflecting the dimensional organization of the set of data sources 104. Other configurations of database system 106, associated network connections, and other hardware and software resources are possible.

Figure 4:
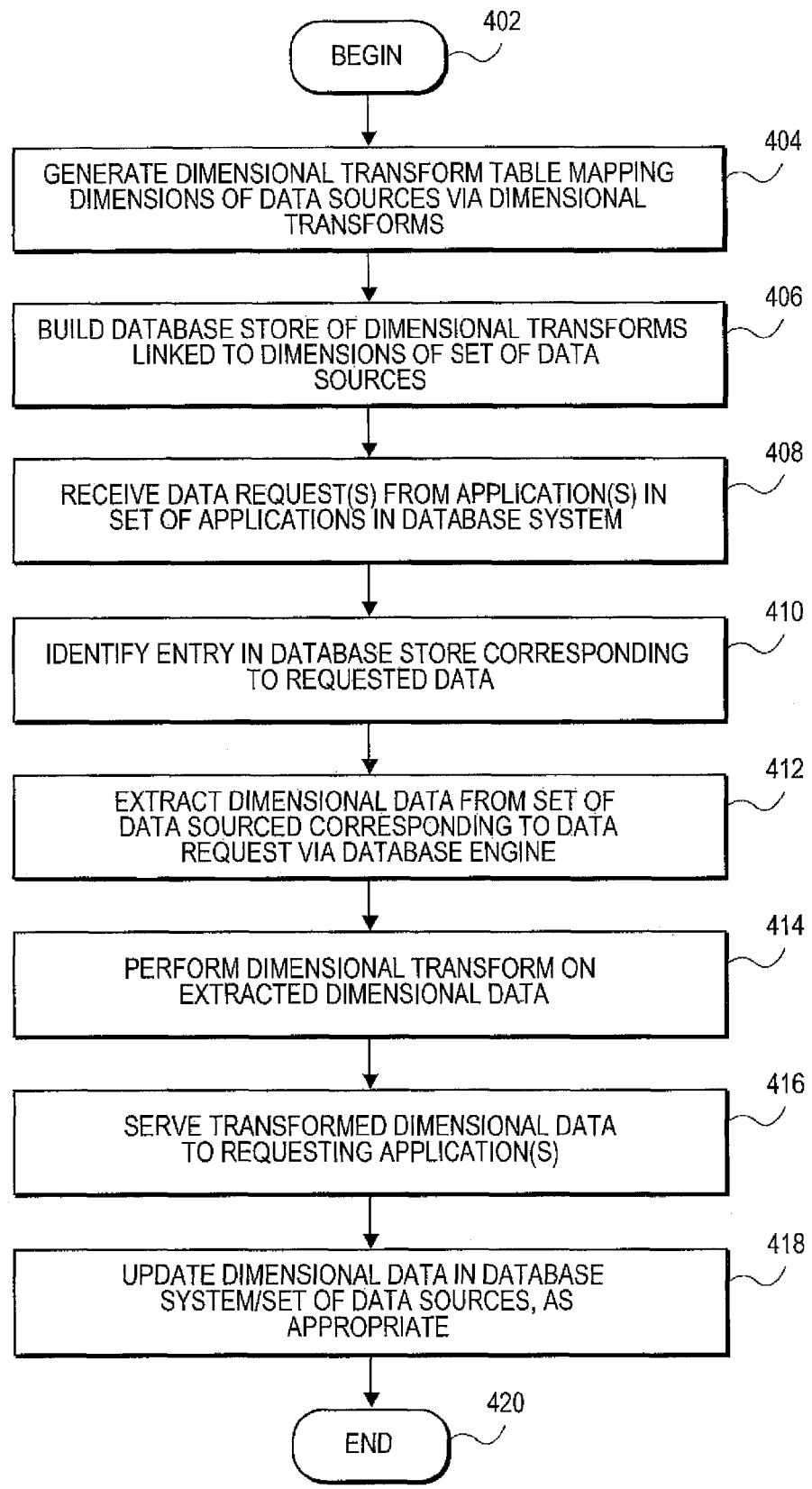
FIG. 4 illustrates overall dimensional transform processing at a middleware database, according to various embodiments.

FIG. 4 illustrates overall processing to manage a middleware database hosting dimensional transforms, according to various embodiments. In 402, processing can begin. In 404, a dimensional transform table 108 can be generated via a database engine 116 of database system 106, the dimensional transform table 108 mapping dimensions of data sources in set of data sources 104 via one or more dimensional transforms 114. In 406, a database store 128 of dimensional transforms 114 linked or encoded by individual dimensions of data in the set of data sources 104 can be built or generated. In 408, a set of data requests 118 can be received from one or more applications in set of applications 102 in database system 106. In 410, database engine 116 can identify an entry in database store 128 and/or transform table 108 corresponding to the requested data.

In 412, dimensional data can be extracted from set of data sources 104 corresponding to the set of data requests 118 via database engine 116. In 414, one or more dimensional transforms 114 can be performed on the extracted dimensional data by database engine 116. In 416, database system 106 can serve or transmit the transformed dimensional output 132 to the requesting application(s). In 418, the dimensional data, transforms, and/or other information stored in database system 106 and/or set of data sources 104 can be updated, as appropriate. In 420, processing can repeat, return to a prior processing point, jump to a further processing point, or end.

The foregoing description is illustrative, and variations in configuration and implementation may occur to persons skilled in the art. For example, while embodiments have been described in which database system 106 generates and maintains a dimensional transform 114 by way of a transform table 108, in embodiments other structures for establishing and storing the relationship between source dimensions, data, and resulting transformed dimensional output 132 can be used. For further example, while embodiments have been described in which set of data sources 104 consist of data stored in databases or data stores, in embodiments, other types or sources of data can be used. For example, in embodiments, set of data sources 104 can be or include live or streamed data, instead of stored data. Yet further, while embodiments have been described in which a single database system 106 generates and manages transform table 108 and related resources, in embodiments multiple transform engines, for example hosted on multiple servers, can cooperate to generate mappings or transforms between data sources and transformed dimensional output 132 and/or other output. Other resources described as singular or integrated can in embodiments be plural or distributed, and resources described as multiple or distributed can in embodiments be combined. The scope of the present teachings is accordingly intended to be limited only by the following claims.

What is claimed is:
1. A method comprising:
storing, by a processor at a middleware database system, a dimensional transform table, wherein each record in the dimensional transform table comprises a dimension field that identifies at least one dimension of extracted data from at least one of a plurality of data sources and a dimensional transform field that stores an operation for transforming data from the at least one dimension, wherein the dimensional transform table comprises a data source field identifying a data source which contributes the at least one dimension of the extracted data, and is stored at the middleware database system without storing data from the plurality of data sources at the middleware database system;
receiving, by the middleware database system, a data request from at least one application at a system that is separate from the middleware database system;
identifying, by the middleware database system, a record from the data source field of the dimensional transform table that corresponds to a subset of the plurality of data sources and to a dimension of data from the subset of the plurality of data sources in view of the data request and the dimension field of the record;

extracting, by the middleware database system, data corresponding to the dimension of data from the subset of the plurality of data sources for the identified record; and performing, by the middleware database system, the operation from the dimensional transform field of the dimensional transform table for the identified record on the extracted data to generate a transformed dimensional output comprising a three-dimensional data block, the three dimensional data block generated by combining a plurality of dimensions hosted in a respective plurality of data sources.

2. The method of claim 1, wherein the at least one application comprises a plurality of applications.

3. The method of claim 1, wherein the plurality of data sources comprises at least one relational database.

4. The method of claim 1, wherein the plurality of data sources comprises at least one online analytical database (OLAP) database.

5. The method of claim 1, wherein the plurality of data sources comprises at least one streamed data source.

6. The method of claim 1, wherein the operation comprises an extension of a data field contained in the dimension of data from the subset of the plurality of data sources.

7. The method of claim 1, further comprising combining the transformed dimensional output of the dimension of data from the subset of the plurality of data sources to generate a transformed multi-dimensional object.

8. The method of claim 1, wherein the dimension of data from the subset of the plurality of data sources characterizes a type of data in the subset of the plurality of data sources.

9. The method of claim 8, wherein the type of data is a year.

10. A system comprising:
a database store at a middleware database system to store a dimensional transform table, wherein each record in the dimensional transform table comprises a dimension field that identifies at least one dimension of extracted data from at least one of a plurality of data sources and a dimensional transform field that stores an operation for transforming data from the at least one dimension, wherein the dimensional transform table comprises a data source field identifying a data source which contributes the at least one dimension of the extracted data, and is stored at the middleware database system without storing data from the plurality of data sources at the middleware database system;
an interface at the middleware database system to receive a data request from at least one application at a system that is separate from the middleware database system; and
a processor at the middleware database system to communicate with the interface and the database store to:
identify a record from the data source field of the dimensional transform table that corresponds to a subset of the plurality of data sources and to a dimension of data from the subset of the plurality of data sources in view of the data request and the dimension field of the record,
extract data corresponding to the dimension of data from the subset of the plurality of data sources for the identified record, and
perform the operation from the dimensional transform field of the dimensional transform table for the identified record on the extracted data to generate a transformed dimensional output comprising a three-dimensional data block, the three dimensional data block generated by combining a plurality of dimensions hosted in a respective plurality of data sources.

11. The system of claim 10, wherein the at least one application comprises a plurality of applications.

12. The system of claim 10, wherein the plurality of data sources comprises at least one relational database.

13. The system of claim 10, wherein the plurality of data sources comprises at least one online analytical database (OLAP) database.

14. The system of claim 10, wherein the plurality of data sources comprises at least one streamed data source.

15. The system of claim 10, wherein the operation comprises an extension of a data field contained in the dimension of data from the subset of the plurality of data sources.

16. The system of claim 10, wherein the processor is further to combine the transformed dimensional output of the dimension of data from the subset of the plurality of data sources to generate a transformed multi-dimensional object.

17. The system of claim 10, wherein the dimension of data from the subset of the plurality of data sources characterizes a type of data in the subset of the plurality of data sources.

18. The system of claim 17, wherein the type of data is a year.

19. A non-transitory computer-readable medium having instructions stored thereon that, when executed by a processor, cause the processor to:
store, by the processor at a middleware database system, a dimensional transform table, wherein each record in the dimensional transform table comprises a dimension field that identifies at least one dimension of extracted data from at least one of a plurality of data sources and a dimensional transform field that stores an operation for transforming data from the at least one dimension, wherein the dimensional transform table comprises a data source field identifying a data source which contributes the at least one dimension of the extracted data, and is stored at the middleware database system without storing data from the plurality of data sources at the middleware database system;
receive, by the middleware database system, a data request from at least one application at a system that is separate from the middleware database system;
identify, by the middleware database system, a record from the data source field of the dimensional transform table that corresponds to a subset of the plurality of data sources and to a dimension of data from the subset of the plurality of data sources in view of the data request and the dimension field of the record;
extract, by the middleware database system, data corresponding to the dimension of data from the subset of the plurality of data sources for the identified record; and
perform, by the middleware database system, the operation from the dimensional transform field of the dimensional transform table for the identified record on the extracted data to generate a transformed dimensional output comprising a three-dimensional data block, the three dimensional data block generated by combining a plurality of dimensions hosted in a respective plurality of data sources.

20. The non-transitory computer-readable medium of claim 19, wherein the operation comprises an extension of a data field contained in the dimension of data from the subset of the plurality of data sources.

* * * * *